(12) United States Patent
Li

(10) Patent No.: US 12,299,049 B2
(45) Date of Patent: May 13, 2025

(54) INFORMATION PROCESSING METHOD AND APPARATUS, DEVICE, AND MEDIUM

(71) Applicant: BEIJING BYTEDANCE NETWORK TECHNOLOGY CO., LTD., Beijing (CN)

(72) Inventor: Linmeng Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/548,456

(22) PCT Filed: Apr. 7, 2022

(86) PCT No.: PCT/CN2022/085439
§ 371 (c)(1),
(2) Date: Aug. 30, 2023

(87) PCT Pub. No.: WO2022/252806
PCT Pub. Date: Dec. 8, 2022

(65) Prior Publication Data
US 2024/0169000 A1    May 23, 2024

(30) Foreign Application Priority Data

May 31, 2021    (CN) .......................... 202110601192.1

(51) Int. Cl.
*G06F 16/00*    (2019.01)
*G06F 16/906*    (2019.01)
*G06F 40/279*    (2020.01)

(52) U.S. Cl.
CPC .......... *G06F 16/906* (2019.01); *G06F 40/279* (2020.01)

(58) Field of Classification Search
CPC .......... G06F 16/58; G06F 16/48; G06F 16/56; G06F 16/5846; G06F 16/685;
(Continued)

(56) References Cited

U.S. PATENT DOCUMENTS

| 10,896,222 B1 | 1/2021 | Christodoulopoulos et al. |
| 2008/0195602 A1* | 8/2008 | Keller .................. G06F 16/951 707/999.005 |

(Continued)

FOREIGN PATENT DOCUMENTS

| CN | 103914543 A | 7/2014 |
| CN | 105677931 A | 6/2016 |

(Continued)

OTHER PUBLICATIONS

Office Action issued in CN Patent Application No. 202110601192.1, Apr. 8, 2023 with English translation (30 pages).

(Continued)

*Primary Examiner* — Shyue Jiunn Hwa
(74) *Attorney, Agent, or Firm* — Astute IP Law Group

(57) ABSTRACT

Provided are an information processing method and an apparatus, a device, and a medium. The information processing method includes the steps described below. Multiple constituent elements corresponding to a target collection are acquired. A first type of entities satisfying the multiple constituent elements are determined. Based on multimedia information of the first type of entities, collection content of the target collection is generated. According to feature information of the target collection, a second type of entities are determined. Moreover, a target entity associated with the collection content is determined from the first type of entities and the second type of entities.

15 Claims, 13 Drawing Sheets

(58) Field of Classification Search
CPC ...... G06F 16/9577; G06F 16/44; G06F 3/165; G06F 16/353; G06F 16/637; G06F 16/68; G06F 16/735; G06F 16/7834; G06F 16/7844; G06F 16/785; G06F 16/786; G06F 16/41; G06F 16/489; G06F 16/951; G06F 16/9535; G06F 16/24578; G06F 16/9574; G06Q 2230/00; G06T 13/00; G06T 13/205; H04L 67/02; H04N 21/44226; H04N 21/4788; H04N 21/632

See application file for complete search history.

(56) References Cited

U.S. PATENT DOCUMENTS

| | | | |
|---|---|---|---|
| 2013/0006952 A1 | 1/2013 | Wong et al. | |
| 2013/0204711 A1* | 8/2013 | Worthen | G06Q 30/0269 705/26.61 |
| 2015/0356127 A1 | 12/2015 | Pierre et al. | |
| 2017/0060857 A1* | 3/2017 | Imbruce | G06T 13/205 |
| 2019/0197166 A1 | 6/2019 | Shi et al. | |
| 2021/0042366 A1 | 2/2021 | Hicklin et al. | |

FOREIGN PATENT DOCUMENTS

| | | |
|---|---|---|
| CN | 106951526 A | 7/2017 |
| CN | 107105031 A | 8/2017 |
| CN | 107193974 A | 9/2017 |
| CN | 107346336 A | 11/2017 |
| CN | 107784029 A | 3/2018 |
| CN | 109635120 A | 4/2019 |
| CN | 110555627 A | 12/2019 |
| CN | 110674394 A | 1/2020 |
| CN | 110716991 A | 1/2020 |
| CN | 112052297 A | 12/2020 |
| CN | 112084268 A | 12/2020 |
| CN | 112084405 A | 12/2020 |
| CN | 112257444 A | 1/2021 |
| CN | 112559718 A | 3/2021 |
| CN | 113221572 A | 8/2021 |
| WO | 2021/004311 A1 | 1/2021 |

OTHER PUBLICATIONS

Office Action issued in CN Patent Application No. 202110601192.1, Jan. 18, 2023 with English translation (24 pages).
Notice of Rejection issued in CN Patent Application No. 202110601192.1, Jul. 7, 2023 with English translation (19 pages).
Supplemental Search Report, Chinese Patent Application No. 2021106011921, Apr. 8, 2024, with English translation (8 pages).
International Search Report and Written Opinion, International Patent Application No. PCT/CN2022/085439, Jun. 9, 2022, with English translation of Search Report (11 pages).

* cited by examiner

Collection

Male star whose height is below 170

Conte[Choose a template]
Added

| Choose a template | | | Template content preview | Confirm |
|---|---|---|---|---|

Choose a template:
- Figure ⟩ Historical figure — Host
- Entertainment — Sports figure — Entertainer
- Culture — Industry figure — Actor
- Sports — Virtual figure — Director
- History — Entertainment figure — Screenwriter
- Geography — Political figure — Music figure
- Nature — Music group
- Society — Internet celebrity
- Life
- Others Template content preview:

Basic information
Chinese name, Foreign name, Alias, Nationality, Occupation, Representative work...

1. A

2. B

3. C

4. Star D ×

5. Star E ×

6. Star F ×

Add an entity | Star E

Star E [Chinese woman star]
Star E [Artist]
Star E [Teacher]
Star E [Painter]

[Previous step]    [Next step]

FIG. 2

Male star whose height is below 170

Content candidate tool: Figure ⟩ Entertainment figure ⟩ Entertainer ∨

Occupation: Star
Gender: Male
Date of birth: Please fill in the content
Height: Below 170

Nationality: Please fill in the content
Place of birth: Please fill in the content
Date of death: Please fill in the content
Ethnicity: Please fill in the content

...

[Screen] [Add with one click]

Screening result (100)

1. Star G ×
2. Star H ×
3. Star I ×
4. Star J ×
5. Star K ×

Male star whose height is below 170

Content candidate tool [Please choose]

Added entities (23)

1. Star A ×
2. Star B ×
3. Star C ×
4. Star D ×
5. Star E ×
6. Star F ×

...

[Add an entity] | Star E
Star E [Chinese woman star]
Star E [Artist]
Star E [Teacher]
Star E [Painter]

[Previous step] [Next step]

FIG. 4

2020 TV show little flowers

Associated entities (23) | Empty |

| Star A × | Star G × |
| Star B × | Star H × |
| Star C × | Star I × |
| Star D × | Star J × |
| Star E × | Star K × |
| Star F × | Star L × |
| ... | |

Add an associated entity | Star E
Star E [Chinese woman star]
Star E [Artist]
Star E [Teacher]
Star E [Painter]

Previous step | Next step

FIG. 5

Inventory of those excellent performers who graduated from famous universities Is there really a top student among stars? Let's take a look at the super real top students among the stars and have a glimpse of the charm of the world's famous universities by the way A total of twenty-four entities Star A
Actor from Mainland China
University A Star B
Actress from Mainland China
University B Star C
Singer, actor, host, and professional racing driver
University C Star D
Actress from Mainland China
University D Star E
Chinese film and television actor
University E

FIG. 11

INFORMATION PROCESSING METHOD AND APPARATUS, DEVICE, AND MEDIUM

CROSS-REFERENCE TO RELATED APPLICATIONS

The present application is a national stage application filed under 35 U.S.C. 371 based on International Patent Application No. PCT/CN2022/085439, filed on Apr. 7, 2022, which claims priority to Chinese Patent Application No. 202110601192.1 filed with the China National Intellectual Property Administration (CNIPA) on May 31, 2021, the disclosures of which are incorporated herein by reference in their entireties.

The present application claims priority to Chinese Patent Application No. 202110601192.1 filed with the China National Intellectual Property Administration (CNIPA) on May 31, 2021, the disclosure of which is incorporated herein by reference in its entirety.

TECHNICAL FIELD

The present disclosure relates to the technical field of information processing, for example, an information processing method and an apparatus, a device, and a medium.

BACKGROUND

With the rapid development of Internet technology, people can learn many kinds of knowledge conveniently and quickly from the Internet.

In some content consumption scenarios, entities can be presented, or a collection of multiple entities with the same features can be presented to users so that users can understand the entities or the connection between the entities. However, when entities or collections are presented, users usually need to be redirected multiple times to fully understand the connection between entities and collections and cannot intuitively establish the connection between entities and collections.

SUMMARY

The present disclosure provides an information processing method and an apparatus, a device, and a medium.

The present disclosure provides an information processing method. The method includes acquiring a plurality of constituent elements corresponding to a target collection, determining a first type of entities satisfying the plurality of constituent elements, generating, based on multimedia information of the first type of entities, collection content of the target collection, determining, according to feature information of the target collection, a second type of entities, and determining a target entity associated with the collection content from the first type of entities and the second type of entities.

The present disclosure also provides an information processing method. The method includes acquiring encyclopedia content information of a target entity, where the encyclopedia content information includes collection information of at least one collection associated with the target entity: and presenting, according to the presentation scenario of the encyclopedia content information, the collection information of the at least one collection associated with the target entity.

The present disclosure also provides an information processing apparatus. The apparatus includes a first-type entity module, a collection content module, a second-type entity module, and an association module.

The first-type entity module is configured to acquire a plurality of constituent elements corresponding to a target collection and determine a first type of entities satisfying the plurality of constituent elements.

The collection content module is configured to generate, based on multimedia information of the first type of entities, collection content of the target collection.

The second-type entity module is configured to determine, according to feature information of the target collection, a second type of entities.

The association module is configured to determine a target entity associated with the collection content from the first type of entities and the second type of entities.

The present disclosure also provides an information processing apparatus. The apparatus includes an entity content module and a presentation module.

The entity content module is configured to acquire encyclopedia content information of a target entity. The encyclopedia content information includes collection information of at least one collection associated with the target entity.

The presentation module is configured to present, according to the presentation scenario of the encyclopedia content information, the collection information of the at least one collection associated with the target entity.

The present disclosure also provides an electronic device that includes a processor and a memory. The memory is configured to store instructions executable by the processor. The processor is configured to read the executable instructions from the memory and execute the instructions to implement the information processing method described above.

The present disclosure also provides a computer-readable storage medium, which stores a computer program configured to execute the information processing method described above.

BRIEF DESCRIPTION OF DRAWINGS

FIG. 2 is a diagram illustrating determination of constituent elements according to an embodiment of the present disclosure.

FIG. 3 is a diagram illustrating determination of constituent elements according to an embodiment of the present disclosure.

FIG. 4 is a diagram illustrating match of a first type of entities according to an embodiment of the present disclosure.

FIG. 5 is a diagram illustrating association of an entity according to an embodiment of the present disclosure.

FIG. 11 is a diagram illustrating another collection presentation according to an embodiment of the present disclosure.

DETAILED DESCRIPTION

Embodiments of the present disclosure are described hereinafter with reference to the drawings. The drawings illustrate some embodiments of the present disclosure, but the present disclosure may be implemented in various manners. These embodiments are provided for an understanding of the present disclosure. The drawings and embodiments of the present disclosure are merely illustrative.

Steps described in method embodiments of the present disclosure may be performed in sequence and/or in parallel. Additionally, the method embodiments may include additional steps and/or omit some of the illustrated steps. The scope of the present disclosure is not limited in this respect.

The term "include" and variations thereof used herein refer to "including, but not limited to". The term "based on" refers to "at least partially based on". The term "an embodiment" refers to "at least one embodiment". The term "another embodiment" refers to "at least one another embodiment". The term "some embodiments" refers to "at least some embodiments". Definitions of other terms are given in the description hereinafter.

Concepts such as "first" and "second" in the present disclosure are used to distinguish between apparatuses, between modules, or between units and are not intended to limit the order or mutual dependence of the functions performed by these apparatuses, modules, or units.

"One" and "multiple" mentioned in the present disclosure are not limiting but illustrative and should be construed by those skilled in the art as "one or more" unless otherwise specified in the context.

The names of messages or information exchanged between multiple apparatuses in the embodiments of the present disclosure are used for illustrative purposes only and are not used to limit the scope of these messages or information.

Users have a large consumption demand for encyclopedia content every day. The connection between entries with different attributes and between an entry and a collection including multiple entries is weak. The users need to be redirected multiple times to fully understand the connection. To solve the preceding problems, embodiments of the present disclosure provide an information processing method, which is described below in connection with embodiments.

Figure 1:
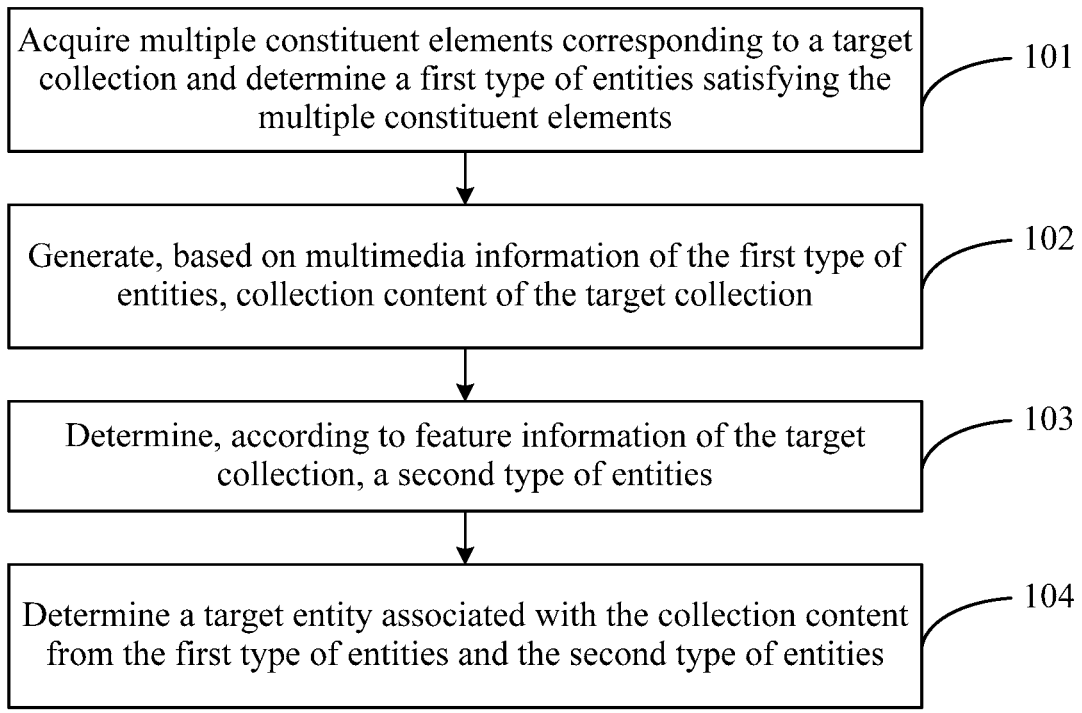
FIG. 1 is a flowchart of an information processing method according to an embodiment of the present disclosure.

FIG. 1 is a flowchart of an information processing method according to an embodiment of the present disclosure. The method may be executed by an information processing apparatus. The apparatus may be implemented in software and/or hardware and may be generally integrated into an electronic device. As shown in FIG. 1, the method is applied to a client or server and includes the steps described below.

101: Multiple constituent elements corresponding to a target collection are acquired, and a first type of entities satisfying the multiple constituent elements are determined.

A constituent element may be element information constituting a collection, for example, a keyword constituting the collection title in a different attribute dimension. An attribute dimension may be a classification direction involved in the collection title. For example, assuming that the attribute dimension of the collection title may include height, age, gender, and occupation, the keyword of height is "above 170": the keyword of age is "post-90s": the keyword of gender is "female": and the keyword of occupation is "entertainer". The preceding keywords of "above 170", "post-90s", "female", and "entertainer" under different attribute dimensions are constituent elements. The collection refers to a set of multiple entities satisfying all the constituent elements. An entity may be a figure, an animal, an event, and a natural phenomenon.

The constituent element may be input by a user or obtained based on a preset rule. The preset rule may be set according to a practical situation. In an example, the constituent element may be determined according to hotspot content or a user's interactive content. In response to determining the constituent element according to the hotspot content, multiple keywords may be extracted from the hotspot content, and several of the keywords are selected as the constituent elements. For example, assuming that the hotspot content is the Golden Horse Awards, keywords such as leading actress, leading actor, post-90s, and 28th may be extracted from images, texts, and videos related to the Golden Horse Awards as the constituent elements. In response to determining the constituent element according to a user's interactive content, the interactive content may include content such as search information and comment information, multiple keywords may be extracted from the interactive content, and several of the keywords are selected as the constituent elements. For example, assuming that the user's search information is "post-90s winners of the Golden Horse Awards", "the Golden Horse Awards", "post-90s", and "winners" may be extracted from the search information as the constituent elements. The preceding determination method of constituent elements is merely an example and not an exclusive limitation.

In this embodiment of the present disclosure, determining the first type of entities satisfying the multiple constituent elements includes matching the constituent elements with attribute information of multiple entities in an entity database and determining, according to the first matching result, the first type of entities.

The entity database may be a pre-established database including multiple entities. The attribute information of an entity refers to feature information used to represent the entity in different attribute dimensions. For example, the attribute information of a figure entity may include feature information of the figure in attribute dimensions such as height, age, gender, and occupation. The first type of entities may include one or more entities. This embodiment does not limit the number of entities included in the first type of entities.

After acquiring multiple constituent elements of a target collection, the server may separately match the multiple constituent elements with the attribute information of multiple entities in an entity database, that is, the multiple constituent elements are matched with the information under a corresponding attribute dimension in the attribute information. If one piece of attribute information includes a constituent element, it is determined that the matching is successful, and then entities corresponding to pieces of successfully matched attribute information may be determined. The first matching result includes successfully matched entities. Then, the successfully matched entities are determined as the first type of entities.

Optionally, determining, according to the first matching result, the first type of entities includes sorting, according to interaction data, successfully matched entities and determining a first preset number of the successfully matched entities sorted first as the first type of entities. The interactive data refer to the interactive operation data between a user and the multimedia content related to an entity introduction. For example, the interactive data may include views, clicks, and comments.

After the first matching result is determined, the successfully matched entities may be sorted according to the interaction data, and a first preset number of the successfully matched entities sorted first are determined as the first type of entities. The first preset number may be determined according to a practical condition. For example, the preset number may be 100, and the 100 successfully matched entities sorted first are determined as the first type of entities.

For example, assuming that the constituent elements are "height", "≤170", and "entertainer", multiple entertainer entities whose height is less than or equal to 170 can be matched. All matched entertainers may be used as the first type of entities, or entertainers whose views rank among the top 100 may be used as the first type of entities.

For example, FIG. 2 is a diagram illustrating determination of constituent elements according to an embodiment of the present disclosure, and FIG. 3 is a diagram illustrating determination of constituent elements according to an embodiment of the present disclosure. As shown in FIG. 2, the template content includes different attribute dimensions under the template. As shown in FIG. 3, the attribute dimensions contained in the template "entertainer" include occupation, nationality, gender, place of birth, date of birth, date of death, height, and ethnicity. For example, a user may select the template "entertainer" in FIG. 2 and then input "star", "male", and "below 170" respectively under the attribute dimensions of occupation, gender, and height in FIG. 3. Then it can be determined that the constituent elements include "star", "male", and "below: 170". The title "male star below 170" shown in FIG. 3 can be generated and presented after the constituent elements are determined.

FIG. 2 and FIG. 3 may be pages in the content candidate tool provided by the client. The client acquires, through the pages in FIG. 2 and FIG. 3, keywords in different attribute dimensions input by the user and then sends the keywords to the server. The server determines the keywords in different attribute dimensions as constituent elements of the collection.

For example, FIG. 4 is a diagram illustrating match of a first type of entities according to an embodiment of the present disclosure. As shown in FIG. 3 and FIG. 4, after constituent elements are determined in FIG. 3, the constituent elements may be separately matched with the attribute information of multiple entities in an entity database to determine successfully matched entities. FIG. 3 shows successfully matched stars. The screening result in FIG. 3 includes 100 successfully matched stars that may be used as the first type of entities. Optionally, in this embodiment, successfully matched entities in FIG. 3 whose views rank among the top 100 may be selected and used as the first type of entities. On the basis of FIG. 3, FIG. 4 shows 23 stars selected among the 100 successfully matched stars of FIG. 3 constitute the first type of entities. Both FIG. 3 and FIG. 4 support the manual deletion of an added entity and addition of a new entity.

102: Based on multimedia information of the first type of entities, collection content of the target collection is generated.

The multimedia information of an entity refers to various types of information corresponding to the entity, such as encyclopedia, pictures, text, and video. This embodiment does not limit the type of multimedia information of the entity. The collection content of the target collection may include the introduction information of each entity in the target collection. The introduction information of each entity may match the constituent elements of the preceding collection.

In this embodiment of the present disclosure, after a first type of entities satisfying the multiple constituent elements are determined, each entity in the first type of entities may be searched in the multimedia information of the first type of entities according to an identifier of the entity and an attribute dimension where the multiple constituent elements are located, and multimedia information of the entity in the attribute dimensions where the multiple constituent elements are located is determined as introduction information of the entity.

103: According to feature information of the target collection, a second type of entities are determined.

The second type of entities is a wide range of entities related to the features of the target collection, different from the first type of entities described above. Determining the second type of entities can widely expand entities related to the target collection so that the number of basic entities is ensured, and the accuracy of subsequent determination of related entities is enhanced.

The feature information of the target collection refers to key representative information extracted based on the collection content of the target collection and can represent the features of the target collection.

In this embodiment of the present disclosure, determining, according to the feature information of the target collection, the second type of entities includes extracting multiple keywords in the collection content of the target collection as the feature information, where the collection content includes introduction information of each entity in the target collection, matching the multiple keywords with attribute information of multiple entities in an entity database, and determining, according to the second matching result, the second type of entities. Attribute information of the second type of entities matches at least one keyword.

Multiple keywords may be extracted as feature information from the collection content of the target collection. The extraction method is not limited by this embodiment. For example, the introduction information of each entity in the target collection may be segmented, and a word with the largest number is determined as a keyword. Then, multiple keywords may be matched with attribute information of multiple entities in an entity database. An entity whose matching degree with at least one keyword is greater than a set threshold is determined as a successfully matched entity. Successfully matched entities are determined as the second type of entities. The attribute information of the second type of entities matches at least one keyword. For example, assuming that the feature information of the target collection is "Hundred Flowers Awards" and "female entertainer", entities that successfully match "Hundred Flowers Awards" and "female entertainer" may be determined as the second type of entities.

104: A target entity associated with the collection content is determined from the first type of entities and the second type of entities.

Determining a target entity associated with the collection content may be determining an entity having part of the same or similar meanings with the collection content of the target collection. After the target entity is determined, an associated collection may be presented while the target entity is presented, thereby enhancing the connection between the entity and the collection and shortening the path for users to consume collections.

In this embodiment of the present disclosure, determining the target entity associated with the collection content from the first type of entities and the second type of entities may include de-duplicating the first type of entities and the second type of entities to obtain a candidate entity set: classifying, based on attribute information of each first candidate entity in the candidate entity set, the multiple first candidate entities to obtain multiple types of candidate entity subsets: and selecting, according to a type feature of each type of candidate entity subsets, a preset number of second candidate entities from the multiple types of candidate entity subsets, and determining the second candidate entities as the target entity.

After being determined in the preceding steps, the first type of entities and the second type of entities may be de-duplicated, and duplicate entities are deleted to obtain a candidate entity set. The candidate entity set may include multiple first candidate entities. Then, based on attribute information of each first candidate entity in the candidate entity set, multiple first candidate entities are classified to obtain multiple types of candidate entity subsets. The classification method of the first candidate entity is not limited by this embodiment. For example, a clustering algorithm may be adopted for classification. According to a type feature of each type of candidate entity subsets, a preset number of second candidate entities are extracted as the target entities. The type feature refers to a set feature of each type candidate entity subsets, that is, a feature multiple first candidate entities in each type of candidate entity subsets have. The preset number of different candidate entity subsets may be configured based on the type feature. For example, the preset number may be different for candidate entity subsets whose type features are a figure and an event separately. Optionally, after determining the first type of entities and the second type of entities, the server may directly determine the first type of entities and the second type of entities as the target entities associated with the collection content of the target collection.

In the preceding solution, after the first type of entities and the second type of entities are obtained, some entities may be extracted through de-duplication and classification performed on the first type of entities and the second type of entities and used as entities associated with the collection content of the target collection. This refined processing improves the accuracy of determining entities associated with a collection.

For example, assuming that the first type of entities and the second type of entities include a total of 120 entities, and after de-duplication, 100 entities are obtained as the first candidate entities to form a candidate entity set. After the candidate entity set is classified, 10 candidate entity subsets may be obtained, each of which includes 10 first candidate entities. A part of the first candidate entities are extracted from each candidate entity subset. The extracted first candidate entities are referred to as second candidate entities whose number may be less than or equal to 100. Finally, the second candidate entities are determined as the target entities associated with the content of the target collection.

FIG. 5 is a diagram illustrating association of an entity according to an embodiment of the present disclosure. As shown in FIG. 5, an encyclopedia collection is used as an example. FIG. 5 shows target entities associated with the encyclopedia collection titled "2020 TV show little flowers". FIG. 5 involves 23 stars.

Figure 6:
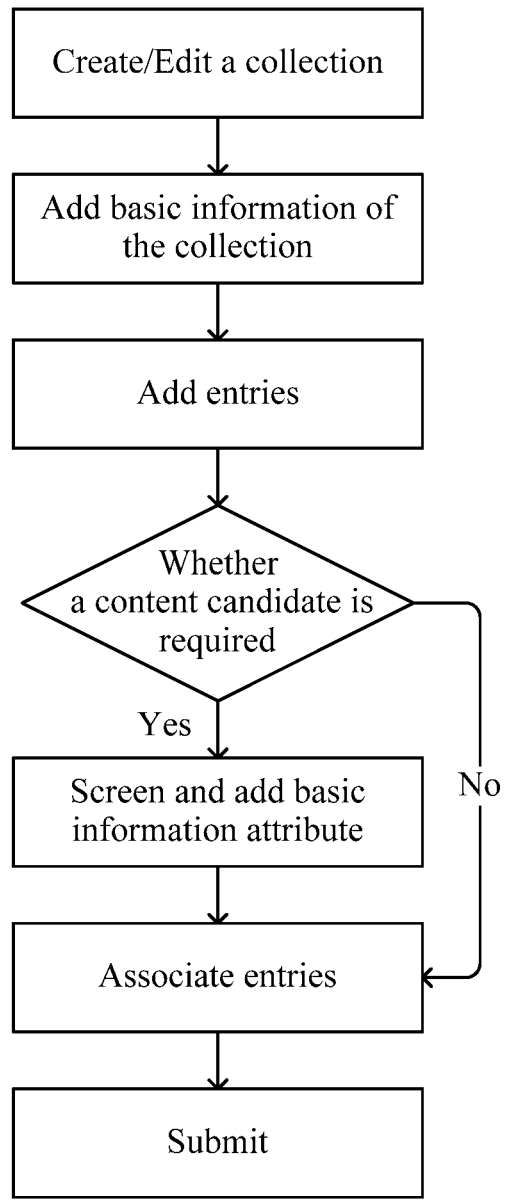
FIG. 6 is a flowchart of another information processing method according to an embodiment of the present disclosure.

For example, FIG. 6 is a flowchart of another information processing method according to an embodiment of the present disclosure. As shown in FIG. 6, FIG. 6 represents the process in which entries associated with the collection content of an encyclopedia collection are determined. The process may include the steps described below: A collection is created/edited. The basic information of the collection is added, that is, multiple constituent elements of the encyclopedia collection are acquired. Entries are added. The entries in this case are a first type of entries that are determined to satisfy the multiple constituent elements. Whether a content candidate is required is determined. If a content candidate is required, basic information attribute is screened and added, that is, entries are added in a semi-automatic manner. The multiple constituent elements are matched with attribute information of multiple entities in an entity database to determine a first type of entities and then the entries are associated. If the content candidate is not required, a first type of entries are manually added and associated. The preceding process of associating entries may include determining a second type of entries according to the feature information of the encyclopedia collection and determining target entries associated with the collection content of the encyclopedia collection according to the first type of entries, the second type of entries, and a preset rule. The preset rule may include the following: The first type of entries are automatically used as the target entries. When the first type of entries are changed, the associated target entries are changed accordingly. When the target entries are changed, the first type of entries remain unchanged. When the first type of entries are edited for the second time, the target entries change the incremental data. The process of associating entries may also include performing deduplication, classification, and extraction on the first type of entries and the second type of entries and finally performing submission, that is, determining target entries associated with the collection content of the encyclopedic collection and submitting the determined target entries for later use. After a user browses an entry, it is determined whether the entry has a corresponding encyclopedia collection, and if yes, the encyclopedia collection is presented when the content of the entry is presented.

In the information processing solution provided by this embodiment of the present disclosure, a first type of entities, collection content of a collection, and a second type of entities can be determined based on constituent elements of the target collection, and then an entity associated with the collection content can be determined in the first type of entities and the second type of entities. In this manner, when presenting an entity, a client can present associated collections, thereby helping users establish the connection between the entity and the collection more efficiently and intuitively, strengthening the connection between the entity and the collection, and shortening the path for the user to consume collections. Moreover, this configuration better satisfies the user's demands for exploration and discovery of entity-related content, improves the diversity and richness of collection and entity presentation, and thus improves the content browsing effect for the user.

Figure 7:
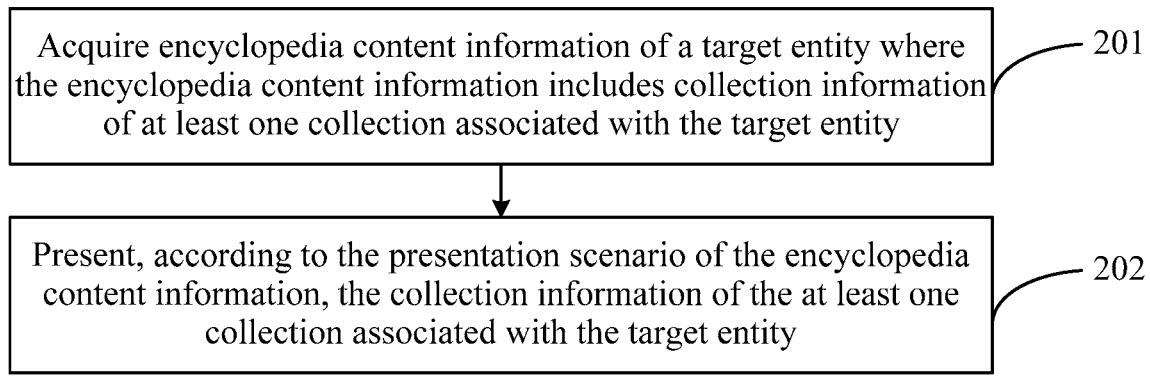
FIG. 7 is a flowchart of another information processing method according to an embodiment of the present disclosure.

FIG. 7 is a flowchart of another information processing method according to an embodiment of the present disclosure. The method may be executed by an information processing apparatus. The apparatus may be implemented in software and/or hardware and may be generally integrated into an electronic device. As shown in FIG. 7, the method is applied to a client and includes the steps described below.

201: Encyclopedia content information of a target entity is acquired, where the encyclopedia content information includes collection information of at least one collection associated with the target entity.

The encyclopedia content information may be a general term for encyclopedia-related information of the target entity and include the entity content of the target entity and the collection information of at least one collection associated with the target entity. The method for determining the association relationship between the target entity and the collection is described in the preceding embodiment and is not described herein. The collection information may include title information of each collection and attribute information of each entity in the each collection. Attribute information of each entity matches the title information of the collection.

The attribute information of each entity refers to various kinds of information related to each entity. The attribute information of each entity may include an entity name and a feature text that matches a core word in the title information of the collection. The title information of the collection may refer to information determined according to the constituent elements of the collection. The core word in the title information of the collection refers to a word obtained by segmenting the title information of the collection. The feature text matched with the core word may be understood as a text of each entity associated with the title information of the collection. One or more feature texts may be provided. For example, the title information of the collection, namely, "post-90s female star who is above 170 cm", includes two feature texts of age and height. Since the attribute information of an entity matches the title information of the collection, the association between the entity and the collection title is enhanced, which helps users understand the content of the collection and the characteristics of each entity.

In this embodiment of the present disclosure, in response to detecting the user's preset trigger operation, the encyclopedia content information of the target entity corresponding to the trigger operation may be acquired. The preset trigger operation is not limited by this embodiment. For example, the preset trigger operation may be a click trigger operation on a target collection and a search trigger operation on a search word.

202: According to the presentation scenario of the encyclopedia content information, the collection information of the at least one collection associated with the target entity is presented.

The presentation scenario may include a collection presentation scenario under an encyclopedia detail page, a collection presentation scenario for a search word, and a collection presentation scenario on a recommendation stream page. Based on the features and purposes of different presentation scenarios, different collection presentation methods and contents may be configured in different presentation scenarios to achieve different presentation effects and meet the consumption demands of users for collections in different scenarios.

Optionally, presenting, according to the presentation scenario of the encyclopedia content information, the collection information of the at least one collection associated with the target entity includes in a case where the presentation scenario is an encyclopedia detail presentation scenario, presenting the collection information of the at least one collection in the form of a card in a collection presentation area of an encyclopedia detail page. The collection information includes the title information of each collection of the at least one collection and attribute information of a first preset number of entities in the each collection.

The encyclopedia detail scenario refers to a presentation scenario for encyclopedia knowledge. The encyclopedia detail page refers to a page for presenting encyclopedia information. In the case where the presentation scenario is an encyclopedia detail presentation scenario, while the entity content of the target entity is presented on an encyclopedia detail page, the title information of at least one collection and the attribute information of a first preset number of entities in each collection may be presented in the form of a card in a collection presentation area of the encyclopedia detail page. The collection presentation area refers to an area configured on the encyclopedia detail page for presenting a collection. Multiple cards may be configured in the collection presentation area. One card corresponds to one collection. The first preset number may be configured according to a practical situation. For example, the first preset number may be a sum of the numbers of all entities in the collection or may be the number of some entities. When the first preset number is greater than or equal to two, that is, at least two entities are presented in the collection, the arrangement of at least two entities is not limited by this embodiment. The entities may be vertically arranged or horizontally sorted, and entities not presented on the current interface may be supported to be viewed by sliding. Each card may slide in a preset direction that may be determined according to a practical situation. For example, the preset direction may be horizontal or vertical.

Figure 8:
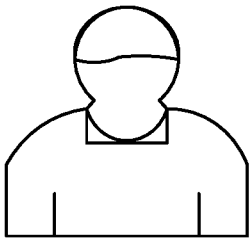
FIG. 8 is a diagram illustrating a collection presentation according to an embodiment of the present disclosure.

For example, FIG. 8 is a diagram illustrating a collection presentation according to an embodiment of the present disclosure. An encyclopedia detail page of an entity "star A" is shown in FIG. 8. The encyclopedia detail page shows the content of the entity and the collection information of related collections associated with the entity. The content of the entity includes a picture, personal information, a profile, participating works, related figures, figure experience, and related collections of "star A" in the drawing. The participating works may include participating films, participating TV series, and cross-talk works. A related collection refers to an encyclopedia collection associated with the entry. Multiple collections may be provided. FIG. 8 illustratively shows a card of one encyclopedia collection presenting two entities. The card includes a collection title "Inventory of those excellent actors who graduated from famous universities" and also shows the attribute information of the two entities named "star A" and "star B". The collection includes twenty-four entities. More entities can be viewed by clicking "view more" or sliding the card. Each entity includes a feature text matching the collection title, for example, "university A" and "university B" in the drawing.

Optionally, presenting, according to the presentation scenario of the encyclopedia content information, the collection information of the at least one collection associated with the target entity includes, in the case where the presentation scenario is a search result presentation scenario or a recommendation information presentation scenario, presenting title information of the at least one collection in the form of a card on a search result page or a recommendation information page.

The search result presentation scenario refers to a scenario where when a search word entered by a user includes an entity, collection information associated with the entity is presented when the entity is presented. The search result page refers to a page where the entity and the collection associated with the search word are presented. The recommendation information presentation scenario refers to a presentation scenario where collections are distributed to recommendation streams when all collections are distributed. The recommendation information page refers to a page for presenting recommendation information and a collection.

In the case where the presentation scenario is a search result presentation scenario, while the search result is presented on a search result page, the title information of at least one collection associated with the target entity is presented in the form of a card on the search result page. The search result includes the target entity. Multiple cards may be configured on the search result page. Each card may present the title information of one collection.

Figure 9:
FIG. 9 is a diagram illustrating another collection presentation according to an embodiment of the present disclosure.

For example, FIG. 9 is a diagram illustrating another collection presentation according to an embodiment of the present disclosure. FIG. 9 shows a search result page with a search word "star C". The search result page shows an entity of "star C" and related collections associated with the entity. The related collections exemplarily present the title information of three collections, including "Those excellent singers who graduated from famous universities", "Excellent singers who won the Golden Melody Awards", and "Singers of talent shows" in the drawing. The title information of each collection is presented on a respective card.

In the case where the presentation scenario is a recommendation information presentation scenario, while the recommendation information is presented on a recommendation information page, the title information of at least one collection associated with the target entity is presented in the form of a card on the recommendation information page so that users can quickly browse related collection information in the recommendation scenario. The recommendation information includes related information of the target entity. Multiple cards may be configured on the recommendation information page. Each card may present the title information of one collection. Optionally, while the title information of at least one collection associated with the target entity is presented on the recommendation information page, the attribute information of at least one entity in the collection may also be presented.

Figure 10:
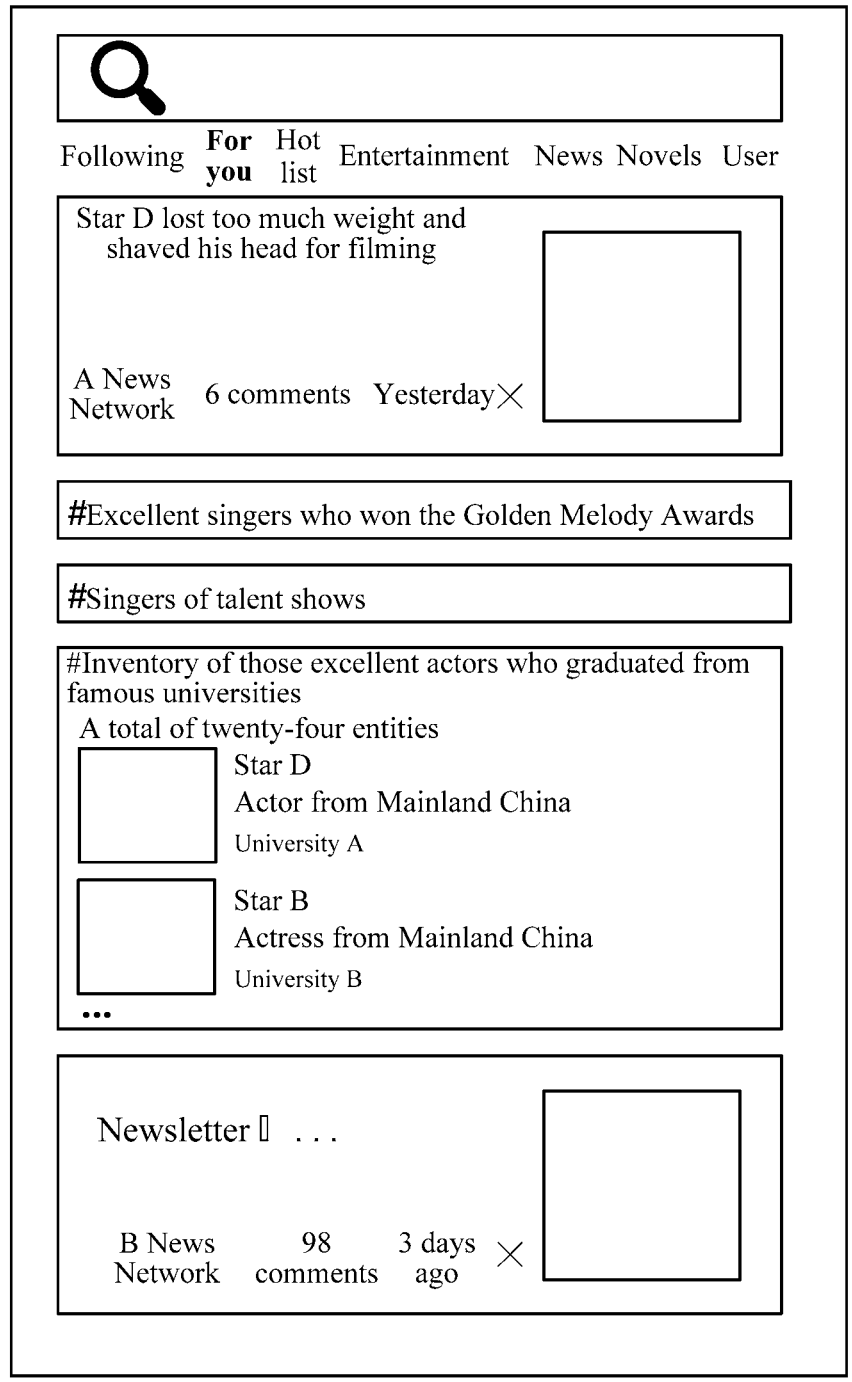
FIG. 10 is a diagram illustrating another collection presentation according to an embodiment of the present disclosure.

For example, FIG. 10 is a diagram illustrating another collection presentation according to an embodiment of the present disclosure. FIG. 10 shows a recommendation information page whose first piece of recommendation information is information about a target entity "star D". Then three collection cards associated with "star D" are illustratively shown. Each card presents information of one collection. The first and second cards only present the title information of the collections. The third card shows the title information of the collection and the attribute information of two entities.

In the preceding solution, according to the features and purposes of different presentation scenarios, collections associated with an entity may be presented in different forms and contents to achieve different presentation effects and meet the consumption demands of users for collections in different scenarios. Moreover, users' demands for exploration and discovery of collections can be better met.

In the information processing solution provided by this embodiment of the present disclosure, encyclopedia content information of a target entity is acquired: the encyclopedia content information includes collection information of at least one collection associated with the target entity: according to the presentation scenario of the encyclopedia content information, the collection information of the at least one collection associated with the target entity is presented. The preceding technical solution is adopted so that when an entity is presented, a collection associated with the entity can be presented, thereby enhancing the connection between the entity and the collection and shortening the path for users to consume collections. Moreover, this configuration better satisfies the user's demands for exploration and discovery of entity-related content, improves the diversity and richness of collection and entity presentation, and thus improves the content browsing effect for the user.

In some embodiments, the information processing method may also include receiving a trigger operation on a target collection of the at least one collection and presenting title information of the target collection and attribute information of each entity in the target collection in a first presentation area of a collection detail page.

The trigger operation refers to any operation for presenting a target collection, which is not limited by this embodiment, for example, a click operation on the target collection. A collection detail page refers to a page for presenting all related information about a collection. For example, when the trigger operation of a user on preset information of a target collection of the at least one collection is detected, all the collection information of the target collection may be presented in a first presentation area of a collection detail page. All the collection information includes the title information of the target collection and the attribute information of each entity in the target collection. The preceding preset information may be configured according to a practical situation. For example, the preset information may be a collection title or a collection picture of the target collection. The preset information is not limited by this embodiment.

For example, FIG. 11 is a diagram illustrating another collection presentation according to an embodiment of the present disclosure. FIG. 11 shows a collection detail page showing an encyclopedia collection titled "Inventory of those excellent performers who graduated from famous universities". FIG. 11 also shows profile information of the encyclopedia collection, that is, "Is there really a top student among stars? Let's take a look at the super real top students among the stars and have a glimpse of the charm of the world's famous universities by the way". In addition, the encyclopedia collection includes 24 entries, and 5 entries are shown in FIG. 11 as an example. Each entry includes information about one star. The attribute information corresponding to each entry is a graduation university in the drawing. For example, for the first entry, the picture of star A, a profile of "actor from Mainland China", and attribute information "university A" matching the collection title are shown.

Since the attribute information of entities has matching information of the collection title, the association between the entity and the collection title is enhanced, which facilitates users' reading.

In some embodiments, in the case where multiple collections are provided, the information processing method may also include presenting, in a second presentation area of the collection detail page, title information of another collection in the multiple collections except the target collection and/or attribute information of a second preset number of entities in the another collection.

The second presentation area, an area different from the preceding first presentation area, is configured on the collection details page. When multiple collections are provided, collection information of another collection in the multiple collections other than the target collection may be presented in the second presentation area of the collection details page. For example, title information of another collection and/or attribute information of a second preset number of entities in the another collection may be presented. The second preset number may be configured according to a practical situation. For example, the second preset number may be all or part of the entities. The second preset number is not limited by this embodiment.

In the preceding solution, when the details of one collection are presented based on the trigger operation, the information of another associated collection may also be presented. In this manner, users can intuitively understand the association between different collections and are facilitated to establish the connection between the collections more efficiently. Moreover, users' clicking is attracted, and the experience in the collections is improved.

Figure 12:
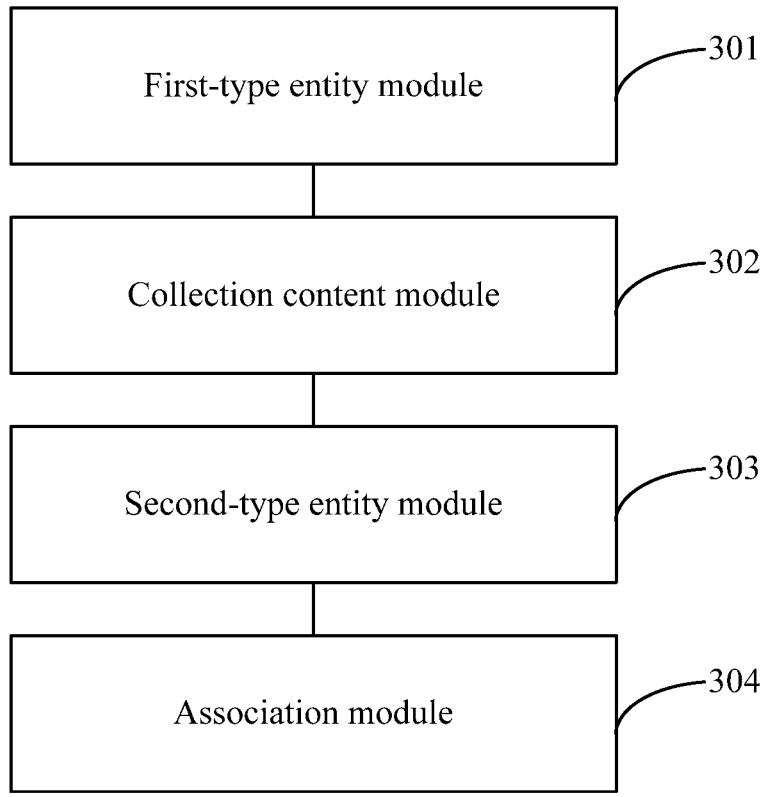
FIG. 12 is a diagram illustrating the structure of an information processing apparatus according to an embodiment of the present disclosure.

FIG. 12 is a diagram illustrating the structure of an information processing apparatus according to an embodiment of the present disclosure. The apparatus may be implemented in software and/or hardware and may be generally integrated into an electronic device. As shown in FIG. 12, the apparatus includes a first-type entity module 301, a collection content module 302, a second-type entity module 303, and an association module 304.

The first-type entity module 301 is configured to acquire multiple constituent elements corresponding to a target collection and determine a first type of entities satisfying the multiple constituent elements. The collection content module 302 is configured to generate, based on multimedia information of the first type of entities, collection content of the target collection. The second-type entity 303 module is configured to determine, according to feature information of the target collection, a second type of entities. The association module 304 is configured to determine a target entity associated with the collection content from the first type of entities and the second type of entities.

Optionally, the first-type entity module 301 is configured to determine the first type of entities satisfying the multiple constituent elements in the following method of matching the multiple constituent elements with attribute information of multiple entities in an entity database and determining, according to the first matching result, the first type of entities.

Optionally, the first-type entity module 301 is configured to determine, according to the first matching result, the first type of entities in the following method of sorting, according to interaction data, successfully matched entities and determining a first preset number of successfully matched entities sorted first as the first type of entities.

Optionally, the second-type entity module 303 is configured to extract multiple keywords in the collection content of the target collection as the feature information, where the collection content includes introduction information of each entity in the target collection: and match the multiple keywords with attribute information of multiple entities in an entity database and determine, according to the second matching result, the second type of entities. Attribute information of the second type of entities matches at least one keyword.

Optionally, the association module 304 is configured to de-duplicate the first type of entities and the second type of entities to obtain a candidate entity set, classify, based on attribute information of each first candidate entity of multiple first candidate entities in the candidate entity set, the multiple first candidate entities to obtain multiple types of candidate entity subsets, select, according to a type feature of each type of candidate entity subsets, a preset number of second candidate entities from the each type of candidate entity subsets, and determine a second candidate entity as the target entity.

The information processing apparatus according to embodiments of the present disclosure may execute the information processing method according to any embodiment of the present disclosure and has corresponding functional modules and effects of executing the method.

Figure 13:
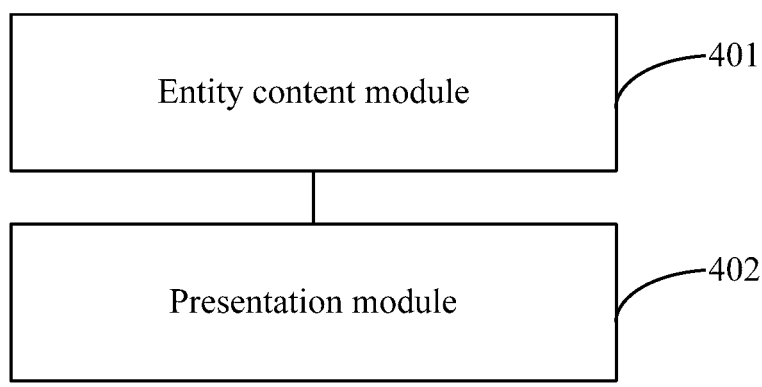
FIG. 13 is a diagram illustrating the structure of another information processing apparatus according to an embodiment of the present disclosure.

FIG. 13 is a diagram illustrating the structure of another information processing apparatus according to an embodiment of the present disclosure. The apparatus may be implemented in software and/or hardware and may be generally integrated into an electronic device. As shown in FIG. 13, the apparatus includes an entity content module 401 and a presentation module 402.

The entity content module 401 is configured to acquire encyclopedia content information of a target entity. The encyclopedia content information includes collection information of at least one collection associated with the target entity. The presentation module 402 is configured to present, according to the presentation scenario of the encyclopedia content information, the collection information of the at least one collection associated with the target entity.

Optionally, the collection information includes title information of a collection and attribute information of each entity in the collection. Attribute information of each entity matches the title information of the collection.

Optionally, the presentation module 402 is configured to, in the case where the presentation scenario is an encyclopedia detail presentation scenario, present the collection information of the at least one collection in the form of a card in a collection presentation area of an encyclopedia detail page. The collection information includes the title information of each collection of the at least one collection and attribute information of a first preset number of entities in the each collection.

Optionally, the presentation module 402 is configured to, in the case where the presentation scenario is a search result presentation scenario or a recommendation information presentation scenario, present title information of the at least one collection in the form of a card on a search result page or a recommendation information page.

Optionally, the apparatus also includes a collection detail module. The module is configured to receive a trigger operation on a target collection of the at least one collection and present title information of the target collection and attribute information of each entity in the target collection in a first presentation area of a collection detail page.

Optionally, in the case where multiple collections are provided, the collection detail module is configured to present, in a second presentation area of the collection detail page, title information of another collection in the multiple collections except the target collection and/or attribute information of a second preset number of entities in the another collection.

The information processing apparatus according to embodiments of the present disclosure may execute the information processing method according to any embodiment of the present disclosure and has corresponding functional modules and effects of executing the method.

Embodiments of the present disclosure provide a computer program product, including a computer program/instruction that, when executed by a processor, implements the information processing method provided by any embodiment of the disclosure.

Figure 14:
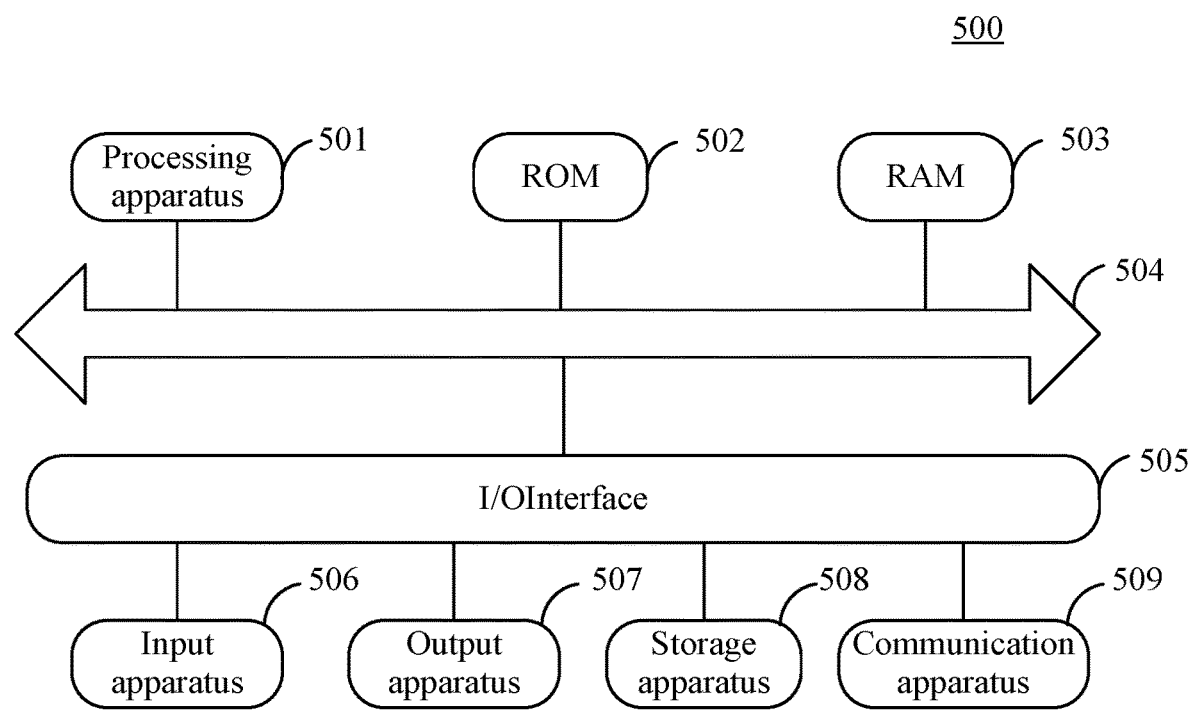
FIG. 14 is a diagram illustrating the structure of an electronic device according to an embodiment of the present disclosure.

FIG. 14 is a diagram illustrating the structure of an electronic device according to an embodiment of the present disclosure. Referring to FIG. 14, FIG. 14 shows the structure of an electronic device 500 applicable to implementing the embodiments of the present disclosure. The electronic device 500 in the embodiments of the present disclosure may include but is not limited to, a mobile terminal such as a mobile phone, a laptop, a digital broadcast receiver, a personal digital assistant (PDA), a PAD, a portable media player (PMP), and a vehicle-mounted terminal (for example, a vehicle-mounted navigation terminal) and a fixed terminal such as a digital TV and a desktop computer. The electronic device shown in FIG. 14 is merely an example and should not impose any limitation on the function and usage scope of embodiments of the present disclosure.

As shown in FIG. 14, the electronic device 500 may include a processing apparatus 501 (such as a central processing unit or a graphics processor). The processing apparatus 501 may perform various appropriate actions and processing according to a program stored in a read-only memory (ROM) 502 or a program loaded into a random access memory (RAM) 503 from a storage apparatus 508. The RAM 503 also stores various programs and data required for the operation of the electronic device 500. The processing apparatus 501, the ROM 502, and the RAM 503 are connected to each other through a bus 504. An input/output (I/O) interface 505 is also connected to the bus 504.

Generally, the following apparatus may be connected to the I/O interface 505: an input apparatus 506 such as a touch screen, a touch pad, a keyboard, a mouse, a camera, a microphone, an accelerometer, and a gyroscope: an output apparatus 507 such as a liquid crystal display (LCD), a speaker, and a vibrator: a storage apparatus 508 such as a magnetic tape and a hard disk: and a communication apparatus 509. The communication apparatus 509 may allow the electronic device 500 to perform wireless or wired communication with other devices to exchange data. FIG. 14 shows the electronic device 500 having various apparatuses, but it is not necessary to implement or be equipped with all the shown apparatuses. Alternatively, the electronic device 500 may implement or be equipped with more or fewer apparatuses.

According to embodiments of the present disclosure, the process described above with reference to the flowchart may be implemented as a computer software program. For example, embodiments of the present disclosure include a computer program product. The computer program product includes a computer program carried in a non-transitory computer-readable medium. The computer program includes program codes for performing the method shown in the flowchart. In such an embodiment, the computer program may be downloaded and installed from the network through the communication apparatus 509, or may be installed from the storage apparatus 508, or may be installed from the ROM 502. When the computer program is executed by the processing apparatus 501, the preceding functions defined in the information processing method of the embodiments of the present disclosure are performed.

The preceding computer-readable medium of the present disclosure may be a computer-readable signal medium, a computer-readable storage medium, or any combination of the computer-readable signal medium and the computer-readable storage medium. The computer-readable storage medium may be, but is not limited to, an electrical, magnetic, optical, electromagnetic, infrared, or semiconductor system, apparatus, or device, or any combination thereof. Examples of the computer-readable storage medium may include, but are not limited to, an electrical connection with one or more wires, a portable computer disk, a hard disk, a RAM, a ROM, an erasable programmable read-only memory (EPROM or flash memory), an optical fiber, a portable compact disc read-only memory (CD-ROM), an optical storage device, a magnetic storage device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a base band or as a part of a carrier wave. Computer-readable program codes are carried in the data signal. Such propagated data signals may take a variety of forms, including, but not limited to, electromagnetic signals, optical signals, or any suitable combination thereof. The computer-readable signal medium may also be any computer-readable medium other than a computer-readable storage medium. The computer-readable signal medium may send, propagate, or transmit a program used by or in conjunction with an instruction execution system, apparatus, or device. The program codes contained on the computer-readable medium may be transmitted on any suitable medium, including, but not limited to, a wire, an optical cable, radio frequency (RF), or any suitable combination thereof.

In some embodiments, the client and the server can communicate by using any currently known or future-developed network protocol such as HyperText Transfer Protocol (HTTP) and can be interconnected by any form or medium of digital data communication (for example, a communication network). Examples of the communication network include a local area network (LAN), a wide area network (WAN), an interconnected network (for example, the Internet), an end-to-end network (for example, an ad hoc end-to-end network), and any currently known or future-developed network.

The preceding computer-readable medium may be included in the preceding electronic device or may exist alone without being assembled into the electronic device.

The preceding computer-readable medium carries one or more programs. When executing the one or more programs, the electronic device performs the steps described below: Multiple constituent elements corresponding to a target collection are acquired. A first type of entities satisfying the multiple constituent elements are determined. Based on multimedia information of the first type of entities, collection content of the target collection is generated. According to feature information of the target collection, a second type of entities are determined. Moreover, a target entity associated with the collection content is determined from the first type of entities and the second type of entities.

Optionally, the preceding computer-readable medium carries one or more programs. When executing the one or more programs, the electronic device performs the steps described below: Encyclopedia content information of a target entity is acquired. The encyclopedia content information includes collection information of at least one collection associated with the target entity. According to the presentation scenario of the encyclopedia content information, the collection information of the at least one collection associated with the target entity is presented.

Computer program codes for performing the operations in the present disclosure may be written in one or more programming languages or a combination thereof. The preceding one or more programming languages include but are not limited to object-oriented programming languages such as Java, Smalltalk, and C++, as well as conventional procedural programming languages such as "C" or similar programming languages. The program codes may be executed entirely on a user computer, partly on a user computer, as a stand-alone software package, partly on a user computer and partly on a remote computer, or entirely on a remote computer or a server. In the case relating to a remote computer, the remote computer may be connected to a user computer via any kind of network including a LAN or a WAN, or may be connected to an external computer (for example, via the Internet by an Internet service provider).

The flowcharts and block diagrams in the drawings show possible architectures, functions, and operations of the system, method, and computer program product according to the multiple embodiments of the present disclosure. In this regard, each block in the flowcharts or block diagrams may represent a module, a program segment, or part of codes that include one or more executable instructions for implementing specified logical functions. It is also to be noted that in some alternative implementations, the functions noted in the blocks may take an order different from the order noted in the drawings. For example, two sequential blocks may, in fact, be executed substantially in parallel, or sometimes executed in the reverse order, which depends on the involved functions. It is also to be noted that each block of the block diagrams and/or flowcharts and combinations of blocks in the block diagrams and/or flowcharts may be implemented by not only a specific-purpose hardware-based system that performs a specified function or action, but also a combination of specific-purpose hardware and computer instructions.

The described units involved in the embodiments of the present disclosure may be implemented by software or hardware. The name of a unit is not intended to limit the unit in one case.

The functions described herein above may be performed at least in part by one or more hardware logic components. For example, without limitation, exemplary types of hardware logic components that may be used include Field Programmable Gate Array (FPGA), Application Specific Integrated Circuit (ASIC), Application Specific Standard Product (ASSP), System on Chips (SOC), and Complex Programmable Logical device (CPLD).

In the context of the present disclosure, a machine-readable medium may be a tangible medium that may contain or store a computer program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. Examples of the machine-readable storage medium may include an electrical connection based on one or more wires, a portable computer disk, a hard disk, a RAM, a ROM, an EPROM or flash memory, an optical fiber, a CD-ROM, an optical storage device, a magnetic storage device, or any appropriate combination thereof.

According to one or more embodiments of the present disclosure, the present disclosure provides an information processing method. The method includes acquiring multiple constituent elements corresponding to a target collection, determining a first type of entities satisfying the multiple constituent elements, generating, based on multimedia information of the first type of entities, collection content of the target collection, determining, according to feature information of the target collection, a second type of entities, and determining a target entity associated with the collection content from the first type of entities and the second type of entities.

According to one or more embodiments of the present disclosure, in the information processing method provided by the present disclosure, determining the first type of entities satisfying the multiple constituent elements includes matching the multiple constituent elements with attribute information of multiple entities in an entity database and determining, according to the first matching result, the first type of entities.

According to one or more embodiments of the present disclosure, in the information processing method provided by the present disclosure, determining, according to the first matching result, the first type of entities includes sorting, according to interaction data, successfully matched entities and determining a first preset number of the successfully matched entities sorted first as the first type of entities.

According to one or more embodiments of the present disclosure, in the information processing method provided by the present disclosure, determining, according to feature information of the target collection, a second type of entities includes extracting multiple keywords in the collection content of the target collection as the feature information, where the collection content includes introduction information of each entity in the target collection: and matching the multiple keywords with attribute information of multiple entities in an entity database and determining, according to the second matching result, the second type of entities. Attribute information of the second type of entities matches at least one keyword.

According to one or more embodiments of the present disclosure, in the information processing method provided by the present disclosure, determining a target entity associated with the collection content from the first type of entities and the second type of entities includes de-duplicating the first type of entities and the second type of entities to obtain a candidate entity set, classifying, based on attribute information of each first candidate entity of multiple first candidate entities in the candidate entity set, the multiple first candidate entities to obtain multiple types of candidate entity subsets, selecting, according to a type feature of each type of candidate entity subsets, a preset number of second candidate entities from the each type of candidate entity subsets, and determining a second candidate entity as the target entity.

According to one or more embodiments of the present disclosure, the present disclosure provides an information processing method. The method includes acquiring encyclopedia content information of a target entity, where the encyclopedia content information includes collection information of at least one collection associated with the target entity: and presenting, according to the presentation scenario of the encyclopedia content information, the collection information of the at least one collection associated with the target entity.

According to one or more embodiments of the present disclosure, in the information processing method provided by the present disclosure, the collection information includes title information of a collection and attribute information of each entity in the collection. Attribute information of each entity matches the title information of the collection.

According to one or more embodiments of the present disclosure, in the information processing method provided by the present disclosure, presenting, according to the presentation scenario of the encyclopedia content information, the collection information of the at least one collection associated with the target entity includes, in the case where the presentation scenario is an encyclopedia detail presentation scenario, presenting the collection information of the at least one collection in the form of a card in a collection presentation area of an encyclopedia detail page. The collection information includes the title information of each collection of the at least one collection and attribute information of a first preset number of entities in the each collection.

According to one or more embodiments of the present disclosure, in the information processing method provided by the present disclosure, presenting, according to the presentation scenario of the encyclopedia content information, the collection information of the at least one collection associated with the target entity includes, in the case where the presentation scenario is a search result presentation scenario or a recommendation information presentation scenario, present title information of the at least one collection in the form of a card on a search result page or a recommendation information page.

According to one or more embodiments of the present disclosure, the information processing method provided by the present disclosure also includes receiving a trigger operation on a target collection of the at least one collection and presenting title information of the target collection and attribute information of each entity in the target collection in a first presentation area of a collection detail page.

According to one or more embodiments of the present disclosure, in the information processing method provided by the present disclosure, in the case where multiple collections are provided, the method also induces presenting, in a second presentation area of the collection detail page, title information of another collection in the multiple collections except the target collection and/or attribute information of a second preset number of entities in the another collection.

According to one or more embodiments of the present disclosure, the present disclosure provides an information processing apparatus. The apparatus includes a first-type entity module, a collection content module, a second-type entity module, and an association module.

The first-type entity module is configured to acquire multiple constituent elements corresponding to a target collection and determine a first type of entities satisfying the multiple constituent elements.

The collection content module is configured to generate, based on multimedia information of the first type of entities, collection content of the target collection.

The second-type entity module is configured to determine, according to feature information of the target collection, a second type of entities.

The association module is configured to determine a target entity associated with the collection content from the first type of entities and the second type of entities.

According to one or more embodiments of the present disclosure, in the information processing apparatus provided by the present disclosure, the first-type entity module is configured to determine the first type of entities satisfying the multiple constituent elements in the following method of matching the multiple constituent elements with attribute information of multiple entities in an entity database and determining, according to the first matching result, the first type of entities.

According to one or more embodiments of the present disclosure, in the information processing apparatus provided by the present disclosure, the first-type entity module is configured to determine, according to the first matching result, the first type of entities in the following method of sorting, according to interaction data, successfully matched entities and determining a first preset number of the successfully matched entities sorted first as the first type of entities.

According to one or more embodiments of the present disclosure, in the information processing apparatus provided by the present disclosure, the second-type entity module is configured to extract multiple keywords in the collection content of the target collection as the feature information, where the collection content includes introduction information of each entity in the target collection: and match the multiple keywords with attribute information of multiple entities in an entity database and determine, according to the second matching result, the second type of entities. Attribute information of the second type of entities matches at least one keyword.

According to one or more embodiments of the present disclosure, in the information processing apparatus provided by the present disclosure, the association module is configured to de-duplicate the first type of entities and the second type of entities to obtain a candidate entity set, classify, based on attribute information of each first candidate entity of multiple first candidate entities in the candidate entity set, the multiple first candidate entities to obtain multiple types of candidate entity subsets, select, according to a type feature of each type of candidate entity subsets, a preset number of second candidate entities from the each type of candidate entity subsets, and determine a second candidate entity as the target entity.

According to one or more embodiments of the present disclosure, the present disclosure provides an information processing apparatus. The apparatus includes an entity content module and a presentation module.

The entity content module is configured to acquire encyclopedia content information of a target entity. The encyclopedia content information includes collection information of at least one collection associated with the target entity.

The presentation module is configured to present, according to the presentation scenario of the encyclopedia content information, the collection information of the at least one collection associated with the target entity.

According to one or more embodiments of the present disclosure, in the information processing apparatus provided by the present disclosure, the collection information includes title information of a collection and attribute information of each entity in the collection. Attribute information of each entity matches the title information of the collection.

According to one or more embodiments of the present disclosure, in the information processing apparatus provided by the present disclosure, the presentation module is configured to, in the case where the presentation scenario is an encyclopedia detail presentation scenario, present the collection information of the at least one collection in the form of a card in a collection presentation area of an encyclopedia detail page. The collection information includes the title information of each collection of the at least one collection and attribute information of a first preset number of entities in the each collection.

According to one or more embodiments of the present disclosure, in the information processing apparatus provided by the present disclosure, the presentation module is configured to, in the case where the presentation scenario is a search result presentation scenario or a recommendation information presentation scenario, present title information of the at least one collection in the form of a card on a search result page or a recommendation information page.

According to one or more embodiments of the present disclosure, in the information processing apparatus provided by the present disclosure, the apparatus also includes a collection detail module. The module is configured to receive a trigger operation on a target collection of the at least one collection and present title information of the target collection and attribute information of each entity in the target collection in a first presentation area of a collection detail page.

According to one or more embodiments of the present disclosure, in the information processing apparatus provided by the present disclosure, in the case where multiple collections are provided, the collection detail module is configured to present, in a second presentation area of the collection detail page, title information of another collection in the multiple collections except the target collection and/or attribute information of a second preset number of entities in the another collection.

According to one or more embodiments of the present disclosure, the present disclosure provides an electronic device. The device includes a processor and a memory. The memory is configured to store instructions executable by the processor.

The processor is configured to read the executable instructions from the memory and execute the instructions to implement the information processing method provided by any embodiment of the present disclosure.

According to one or more embodiments of the present disclosure, the present disclosure provides a computer-readable storage medium, which stores a computer program configured to execute the information processing method provided by any embodiment of the present disclosure.

Additionally, although multiple operations are described in a particular order, it is not a must to perform these operations in this particular order or in sequential order. In a certain environment, multitasking and parallel processing may be advantageous. Similarly, although multiple implementation details are included in the preceding discussion, these should not be construed as limiting the scope of the present disclosure. Some features described in the context of separate embodiments may be implemented in combination in a single embodiment. Rather, features described in the context of a single embodiment may be implemented in multiple embodiments individually or in any suitable sub-combination.

What is claimed is:

1. An information processing method, comprising:
   acquiring a plurality of constituent elements corresponding to a target collection, and determining a first type of entities satisfying the plurality of constituent elements through search, wherein the constituent elements comprise keywords that constitute a title of the target collection in different attribute dimensions;
   generating, based on multimedia information of the first type of entities, collection content of the target collection, wherein the collection content comprises introduction information of the first type of entities;
   determining, according to feature information of the target collection through search, a second type of entities, wherein the feature information of the target collection refers to key representative information extracted from the collection content of the target collection, and the second type of entities are entities related to the feature information of the target collection; and
   determining a target entity associated with the collection content through selection from the first type of entities and the second type of entities.

2. The method of claim 1, wherein determining the first type of entities satisfying the plurality of constituent elements through the search comprises:
   matching the plurality of constituent elements with attribute information of a plurality of entities in an entity database, and determining, according to a first matching result, the first type of entities.

3. The method of claim 2, wherein determining, according to the first matching result, the first type of entities, comprises:
   sorting, according to interaction data, successfully matched entities, and determining a first preset number of the successfully matched entities sorted first as the first type of entities.

4. The method of claim 1, wherein determining, according to the feature information of the target collection through the search, the second type of entities, comprises:
   extracting a plurality of keywords in the collection content of the target collection as the feature information, wherein the collection content comprises introduction information of each entity in the target collection; and
   matching the plurality of keywords with attribute information of a plurality of entities in an entity database, and determining, according to a second matching result, the second type of entities, wherein attribute information of the second type of entities matches at least one keyword of the plurality of keywords.

5. The method of claim 1, wherein determining the target entity associated with the collection content through the search from the first type of entities and the second type of entities, comprises:
   de-duplicating the first type of entities and the second type of entities to obtain a candidate entity set;
   classifying, based on attribute information of each first candidate entity of a plurality of first candidate entities in the candidate entity set, the plurality of first candidate entities to obtain a plurality of types of candidate entity subsets; and
   selecting, according to a type feature of each type of candidate entity subsets of the plurality of types of candidate entity subsets, a preset number of second candidate entities from the each type of candidate entity subsets, and determining the second candidate entities as the target entity.

6. A non-transitory computer-readable storage medium, which stores a computer program configured to execute the information processing method of claim 1.

7. An information processing method, comprising:
   acquiring encyclopedia content information of a target entity, wherein the encyclopedia content information comprises collection information of at least one collection associated with the target entity; and
   presenting, according to a presentation scenario of the encyclopedia content information, the collection information of the at least one collection associated with the target entity-, wherein the collection information comprises title information of each collection of the at least one collection, and attribute information of each entity in each collection that matches the title information of the collection;
   wherein the target entity is determined by:
   acquiring a plurality of constituent elements corresponding to a target collection, and determining a first type of entities satisfying the plurality of constituent elements through search, wherein the constituent elements comprise keywords that constitute a title of the target collection in different attribute dimensions;

generating, based on multimedia information of the first type of entities, collection content of the target collection, wherein the collection content comprises introduction information of the first type of entities;

determining, according to feature information of the target collection through search, a second type of entities, wherein the feature information of the target collection refers to key representative information extracted from the collection content of the target collection, and the second type of entities are entities related to the feature information of the target collection; and determining a target entity associated with the collection content through selection from the first type of entities and the second type of entities.

8. The method of claim 7, wherein presenting, according to the presentation scenario of the encyclopedia content information, the collection information of the at least one collection associated with the target entity, comprises:

in a case where the presentation scenario is an encyclopedia detail presentation scenario, presenting the collection information of the at least one collection in a form of a card in a collection presentation area of an encyclopedia detail page, wherein the collection information comprises the title information of each collection of the at least one collection and attribute information of a first preset number of entities in the each collection.

9. The method of claim 8, further comprising:

in response to receiving a trigger operation on a target collection of the at least one collection, presenting title information of the target collection and attribute information of each entity in the target collection in a first presentation area of a collection detail page.

10. The method of claim 9, wherein in a case where a plurality of collections are provided, the method further comprises:

presenting, in a second presentation area of the collection detail page, at least one of title information of another collection in the plurality of collections except the target collection or attribute information of a second preset number of entities in the another collection.

11. The method of claim 7, wherein presenting, according to the presentation scenario of the encyclopedia content information, the collection information of the at least one collection associated with the target entity, comprises:

in a case where the presentation scenario is a search result presentation scenario or a recommendation information presentation scenario, presenting title information of the at least one collection in a form of a card on a search result page or a recommendation information page.

12. The method of claim 11, further comprising:

receiving a trigger operation on a target collection of the at least one collection; and presenting title information of the target collection and attribute information of each entity in the target collection in a first presentation area of a collection detail page.

13. An electronic device, comprising:

a processor; and a memory configured to store instructions executable by the processor; wherein the processor is configured to read the executable instructions from the memory and execute the instructions to implement the following steps;

acquiring a plurality of constituent elements corresponding to a target collection, and determining a first type of entities satisfying the plurality of constituent elements through search, wherein the constituent elements comprise keywords that constitute a title of the target collection in different attribute dimensions;

generating, based on multimedia information of the first type of entities, collection content of the target collection, wherein the collection content comprises introduction information of the first type of entities;

determining, according to feature information of the target collection through search, a second type of entities, wherein the feature information of the target collection refers to key representative information extracted from the collection content of the target collection, and the second type of entities are entities related to the feature information of the target collection; and determining a target entity associated with the collection content through selection from the first type of entities and the second type of entities.

14. An electronic device, comprising:

a processor; and a memory configured to store instructions executable by the processor; wherein the processor is configured to read the executable instructions from the memory and execute the instructions to implement the information processing method of claim 7.

15. A non-transitory computer-readable storage medium, which stores a computer program configured to execute the information processing method of claim 7.

* * * * *